United States Patent
Choi et al.

(10) Patent No.: US 12,241,866 B2
(45) Date of Patent: Mar. 4, 2025

(54) NON-DESTRUCTIVE INSPECTION METHOD FOR POUCH-TYPE BATTERY

(71) Applicant: INNEREYE CO., LTD., Daegu (KR)

(72) Inventors: Baek Young Choi, Daegu (KR); Seung Gon Kim, Daegu (KR); Sang Moon Koo, Daegu (KR); Jung Won Kim, Daegu (KR)

(73) Assignee: INNEREYE CO., LTD., Daegu (KR)

( * ) Notice: Subject to any disclaimer, the term of this patent is extended or adjusted under 35 U.S.C. 154(b) by 138 days.

(21) Appl. No.: 18/316,572

(22) Filed: May 12, 2023

(65) Prior Publication Data
US 2023/0417706 A1  Dec. 28, 2023

(30) Foreign Application Priority Data

Jun. 24, 2022 (KR) .................. 10-2022-0077656
Oct. 4, 2022 (KR) .................. 10-2022-0126484

(51) Int. Cl.
*G01N 27/90* (2021.01)
*H01M 10/42* (2006.01)

(52) U.S. Cl.
CPC ........ *G01N 27/9006* (2013.01); *H01M 10/42* (2013.01)

(58) Field of Classification Search
CPC ......... G01N 27/82; G01N 27/90–9046; G01N 27/9073–908; G01N 27/9093; H01M 10/42; H01M 10/4207; H01M 10/425; H01M 10/4285; H01M 10/48
USPC ........................................ 324/222, 228–243
See application file for complete search history.

(56) References Cited

U.S. PATENT DOCUMENTS

2021/0365009 A1* 11/2021 Biswas .................. H01M 10/42

FOREIGN PATENT DOCUMENTS

KR         102263601 B1 *  6/2021

OTHER PUBLICATIONS

Choi et al.; Translation of KR102263601B1; Pub. Date Jun. 11, 2021; Translated by Clarivate Analytics (Year: 2021).*

* cited by examiner

*Primary Examiner* — Paresh Patel
*Assistant Examiner* — Rahul Maini
(74) *Attorney, Agent, or Firm* — Revolution IP, PLLC

(57) ABSTRACT

A non-destructive inspection method of detecting defects in a pouch-type secondary battery is disclosed. The defects are due to a crack or weld condition of an electrode sealed with a pouch. The method is used in a manufacturing process of the pouch-type secondary battery, where the manufacturing process includes an electrode tab pre-welding process; an electrode tab main-welding process; and a packing process. The method can include a first crack condition inspecting operation; a second crack condition inspecting operation; and a weld condition inspecting operation. The first crack condition inspecting operation inspects a first crack condition of the electrode tabs which occurs in the electrode tab pre-welding process. The second crack condition inspecting operation inspects a second crack condition of the electrode tabs, which occurs in the electrode tab main-welding process. The weld condition inspecting operation inspects a weld condition of the electrode tabs.

7 Claims, 11 Drawing Sheets

NON-DESTRUCTIVE INSPECTION METHOD FOR POUCH-TYPE BATTERY

CROSS REFERENCE TO RELATED APPLICATION

The present application claims priority to Korean Patent Applications Nos. 10-2022-0077656 and 10-2022-0126484, filed Jun. 24, 2022, and Oct. 4, 2022, respectively, the entire contents of which are incorporated herein for all purposes by these references.

BACKGROUND

Field

The disclosed technology relates generally to a non-destructive inspection method for inspecting a pouch-type secondary battery and, more particularly, to a non-destructive inspection method of accurately detecting defects in a pouch-type secondary battery, where the defects are due to a crack or weld condition (e.g., quality of weld) of an electrode sealed with a pouch of the battery, thereby increasing yield.

Description of the Related Art

Among secondary batteries, the demand for a prismatic secondary battery and a pouch-type secondary battery is rapidly increasing due to their shape, thin thickness and excellent spatial occupancy. In addition, the demand for a secondary lithium battery is also increasing due to its characteristics including high energy density, discharge voltage, and output stability.

The secondary batteries may also be classified according to electrode assemblies of a positive electrode-separator-negative electrode structure. As a representative example of the electrode assembly, there are a jelly roll-type electrode assembly in which long sheet-type positive electrodes and negative electrodes are rolled up with separators interposed therebetween and a stack-type electrode assembly in which a plurality of positive electrodes and negative electrodes cut in units of a predetermined size are sequentially stacked with separators interposed therebetween.

Recently, a stack-pouch-type secondary battery having a structure where a stack-type electrode assembly is built in a pouch-type casing of an aluminum laminate sheet has attracted much attention, and such a stack-pouch-type secondary battery is more widely used due to its excellent spatial occupancy, efficient manufacturing costs, light weight, easy shape transformation, etc.

FIG. 1A illustrates an example of the stack-pouch-type secondary battery, and FIG. 1B illustrates a cross-sectional view of the stack-pouch-type secondary battery.

As shown in FIGS. 1A and 1B, the secondary battery is manufactured through a series of processes. For example, the series of processes largely include an electrode plate manufacturing process, an assembly process, and a formation process. For example, a positive electrode plate and a negative electrode plate are manufactured by applying a mixture of active material, a binder, and a plasticizer to a positive electrode current collector and a negative electrode current collector. Then, an electrode assembly 11 having a predetermined shape is formed by stacking the positive electrode plate and the negative electrode plate onto the opposite sides of a separator. Then, an electrode lead 13 is welded and connected to a plurality of electrode tabs 12 extending from the positive electrode plate and the negative electrode plate of the electrode assembly 11. Then, the electrode assembly 11 is inserted and packed into a pouch 14, and the pouch 14 is injected with an electrolyte solution and then sealed up, thereby completing the secondary battery.

In some cases, cracks or defects in alignment, such as folding in a bending region, or defects in a weld condition (weld strength) may occur in the area of the electrode tabs 12 during the processes of manufacturing the secondary battery due to, e.g., the difference in elongation or thermal expansion between an electrode-coated region to which the active material is applied and an uncoated electrode region to which the active material is not applied, an external physical force caused by welding, etc. The processes can include a process of welding and connecting the electrode lead 13 to the electrode tabs 12 extended from the electrode assembly 11 and a process of inserting and packing the electrode assembly 11 into the pouch 14.

Such cracks or defects in the weld condition, which occur in the area of the electrode tabs 12, cause a low voltage defect. Thus, an inspection process for detecting the cracks or the defective weld condition in the area of the electrode tabs 12 may be performed after completing the assembly process (or before shipment of the assembled battery).

FIG. 2 is a flowchart of a secondary battery manufacturing method of a conventional non-destructive inspection method for a secondary battery.

Referring to FIGS. 1A, 1B, and 2, some conventional secondary battery manufacturing methods include an electrode assembly manufacturing process S11, an electrode tab pre-welding process S12, an electrode tabs main-welding process S13, a packing process S14, and a weld and crack condition inspection process S15.

For example, the electrode assembly 11 is manufactured by stacking the positive electrode plate and the negative electrode plate onto the opposite sides of the separator. (e.g., Electrode assembly manufacturing process S11).

Then, the plurality of electrode tabs 12 extended from the electrode assembly 11 are pre-welded and aligned in order to connect the electrode lead 13 to the electrode tabs 12 extended from the electrode assembly 11. (e.g., Electrode tab pre-welding process S12).

Then, the electrode lead 13 is main-welded and connected to the plurality of aligned electrode tabs 12. (e.g., Electrode tabs main-welding process S13).

Then, the electrode assembly 11 including the electrode tabs 12 is accommodated and packed into the pouch 14 in the state that the electrode lead 13 is partially exposed to the outside. (e.g., Packing process S14).

Then, the crack condition and the weld condition, which the area of the electrode tabs 12 may have during the foregoing manufacturing process, are measured by a non-contact sensor, and defective secondary batteries 10 are filtered out based on a measurement signal so as to ship only passed secondary batteries 10. (e.g., Weld and crack condition inspection process S15).

Thus, the area of the electrode tabs 12 to be inspected is covered with the pouch 14 during the process of inspecting the crack condition and the weld condition in the area of the electrode tabs 12 after completing the packing process S14 as described above. Therefore, the above method may cause that the strength of the measurement signal received in the non-contact sensor is too weak to precisely measure the crack condition and the weld condition (weld strength).

Further, a crack-condition measurement signal for measuring the crack condition and a weld-condition measurement signal for measuring the weld condition may be detected in combination with each other during the process of inspecting the crack condition and the weld condition in the area of the electrode tabs 12 covered with the pouch 14 before shipment after completing the packing process S14 as described above. In this case, it is unclear (erroneously, insufficiently, or excessively) whether the defect based on the measurement signal measured in the area of the electrode tabs 12 is caused by the crack condition or the weld condition (weld strength). Thus, the above described method may not provide a clear detection of whether the defect is caused by the crack or weld condition.

SUMMARY

To resolve one or more above deficiencies, an aspect of the disclosed technology is to provide a non-destructive inspection method for inspecting a pouch-type secondary battery. More specifically, a defect in the pouch-type secondary battery, where the defect is due to a crack or weld condition in a region of electrode tabs sealed up with a pouch, is accurately detected without an error, thereby largely increasing the yield of the pouch-type secondary battery.

Technical problems to be solved in the disclosed technology are not limited to the aforementioned technical problems, and other unmentioned technical problems can be clearly understood from the following description by a person having ordinary knowledge in the art to which the disclosed technology pertains.

Embodiments of the disclosed technology are related to a non-destructive inspection method for a pouch-type secondary battery. This method can be used in a manufacturing process of the pouch-type secondary battery. The process can include an electrode tab pre-welding process of pre-welding and aligning a plurality of electrode tabs extended from an electrode assembly; an electrode tab main-welding process of main-welding and connecting an electrode lead to the pre-welded electrode tabs; and a packing process of packing the electrode tabs and the electrode assembly into a pouch. In some embodiments, the non-destructive inspection method can include: a first crack condition inspecting operation that is performed after the electrode tab pre-welding process, where the first crack condition inspecting operation includes inspecting a first crack condition of the electrode tabs by measuring the first crack condition of the electrode tabs, which occurs in the electrode tab pre-welding process, and comparing the measured first crack-condition measurement signal and a first crack-condition reference signal; a second crack condition inspecting operation that is performed after the electrode tab main-welding process, where the second crack condition inspecting operation includes inspecting the second crack condition of the electrode tabs by measuring a second crack condition of the electrode tabs, which occurs in the electrode tab main-welding process, and comparing a measured second crack-condition measurement signal and a second crack-condition reference signal; and a weld condition inspecting operation that is performed after the electrode tab main-welding process, where the inspecting operation includes inspecting a weld condition of the electrode tabs by measuring a weld condition of the electrode tabs, and comparing the measured weld-condition measurement signal and a weld-condition reference signal.

In the non-destructive inspection method for the pouch-type secondary battery according to an embodiment, the first crack-condition measurement signal and the second crack-condition measurement signal may include reflection signals reflected from the electrode tabs, and the weld-condition measurement signal can include a transmission signal transmitted through the electrode tabs.

In some embodiments, the non-destructive inspection method may further include a third crack condition inspecting operation that is performed after the packing process, where the third crack condition inspecting operation can include inspecting a third crack condition of the electrode tabs by measuring the third crack condition of the electrode tabs, which occurs in the packing process, and comparing a measured third crack-condition measurement signal and a third crack-condition reference signal.

In some embodiments, the third crack condition inspecting operation may include calculating a difference value between the weld-condition measurement signal previously obtained in the weld condition inspecting operation and the third crack-condition measurement signal, and determining the pouch-type secondary battery to be normal upon the difference being within an allowable error range from the third crack-condition reference signal.

In these embodiments, the first crack-condition measurement signal and the second crack-condition measurement signal may include reflection signals reflected from the electrode tabs, the weld-condition measurement signal may include a transmission signal transmitted through the electrode tabs, and the third crack-condition measurement signal may include a transmission signal transmitted through the pouch and the electrode tabs.

Further, the non-destructive inspection method may further include an alignment condition inspecting operation that is performed after the electrode tab main-welding process and inspects an alignment condition of the electrode tabs by measuring the alignment condition of the electrode tabs, where the alignment condition inspecting operation can include comparing a measured alignment condition measurement signal and an alignment condition reference signal.

In the non-destructive inspection method for the pouch-type secondary battery according to an embodiment, the first crack-condition measurement signal and the second crack-condition measurement signal may include reflection signals reflected from the electrode tabs, and the weld-condition measurement signal and the alignment condition measurement signal may include transmission signals transmitted through the electrode tabs.

According to the disclosed technology, a non-destructive inspection method for a pouch-type secondary battery primarily inspects a crack condition in an area of electrode tabs after an electrode tab pre-welding process, and secondarily inspects a crack condition and a weld condition in the area of the electrode tabs after an electrode tab main-welding process, thereby accurately detecting whether the area of the electrode tabs, of which the welding processes are completed, is defective due to the crack and weld conditions before a packing process, i.e., before being packed into the pouch.

Further, the non-destructive inspection method for the pouch-type secondary battery according to the disclosed technology finally inspects the crack condition present in the area of the electrode tabs covered with the pouch after the packing process, in which the difference calculated between a previously measured weld-condition measurement signal and a newly measured crack-condition measurement signal is used as a criterion for detecting cracks, so that the inspection of the crack condition can be highly discriminative in a crack condition inspecting operation after the packing process, and a defect caused by at least one of the crack, alignment, and weld conditions in the area of the electrode tabs of the secondary battery to be finally shipped is accurately detected without erroneous detection, thereby largely increasing the yield of the secondary battery.

Effects of the disclosed technology are not limited to those mentioned above, and it should be understood that the effects of the disclosed technology include all effects that can be inferred from the detailed description or the claims.

DETAILED DESCRIPTION

Hereinafter, embodiments of the disclosed technology, in which the foregoing problems are specifically solved, will be described with reference to the accompanying drawings. In describing the embodiments, like names and like numerals may be used to refer to like elements, and repetitive descriptions thereof will be avoided.

Figure 1A:
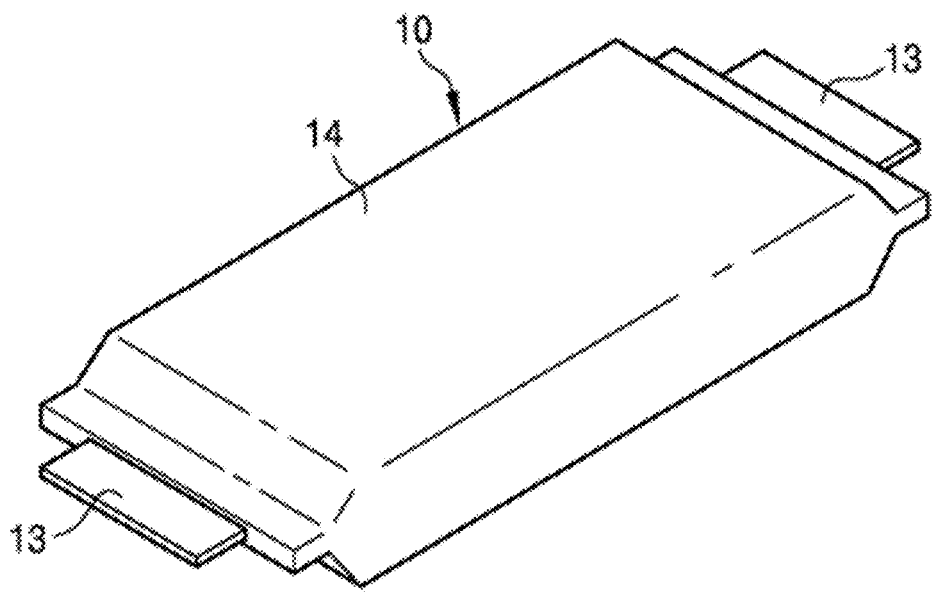
FIG. 1A illustrates an example of a stack-pouch-type secondary battery.
Figure 1B:
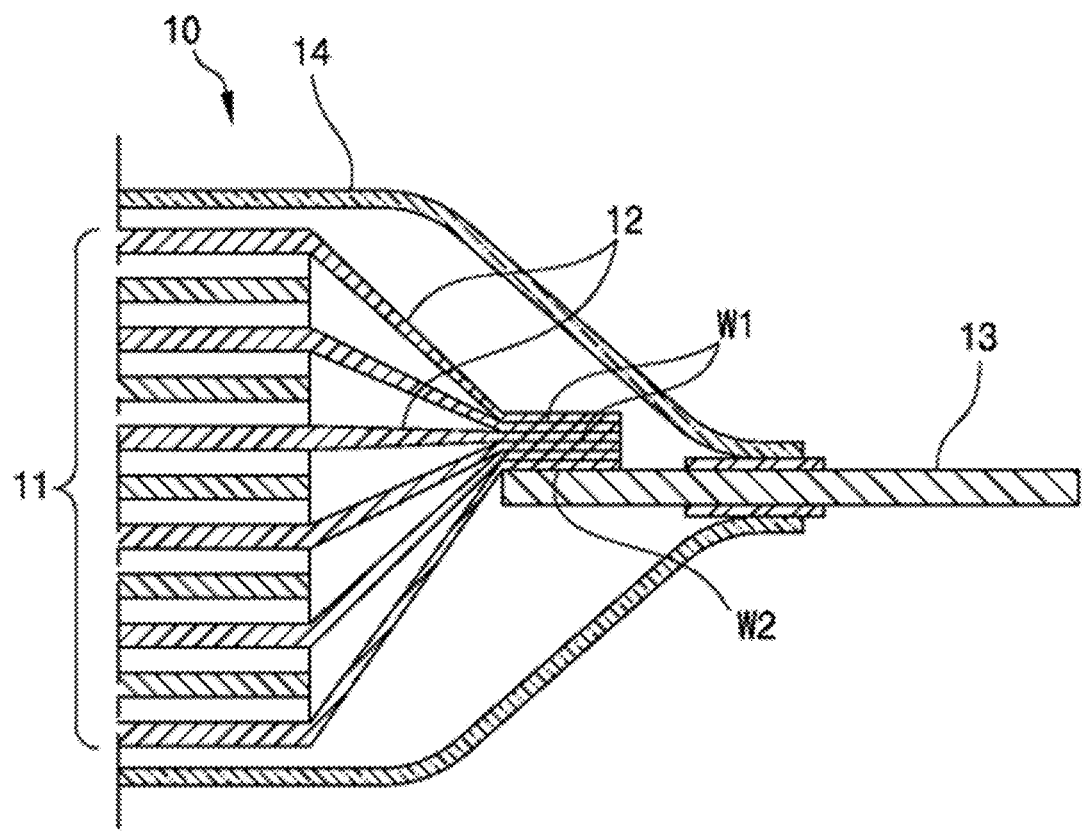
FIG. 1B illustrates an example cross sectional view of a stack-pouch-type secondary battery.
Figure 2:
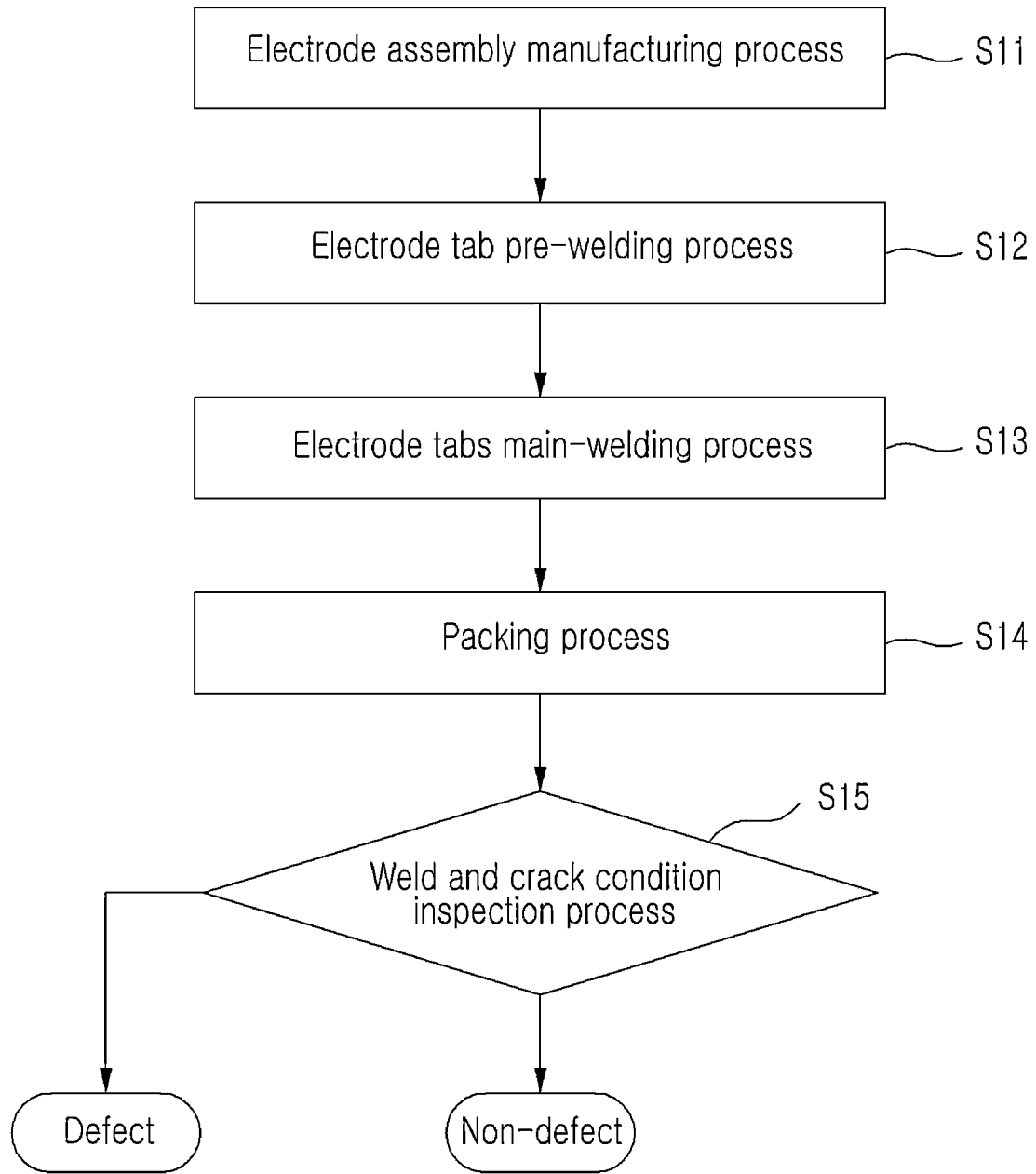
FIG. 2 is a flowchart of a secondary battery manufacturing method to describe a conventional non-destructive inspection method for a secondary battery.

Referring to FIGS. 1A and 1B, a non-destructive inspection method for inspecting a pouch-type secondary battery according to one or more embodiments of the disclosed technology may use a non-destructive inspection process to accurately detect a crack condition and a weld condition of a region of electrode tabs 12 placed inside the pouch 14 without an error in the process of manufacturing a secondary battery 10, thereby largely increasing the yield of a secondary battery 10.

The secondary battery 10 to be inspected is not limited to a stack-pouch-type secondary battery 10, but may include any secondary battery having various structures and shapes. For the convenience of description, the stack-pouch-type secondary battery 10 including a stack-type electrode assembly 11 and a pouch 14 will be described below by way of example.

Figure 3:
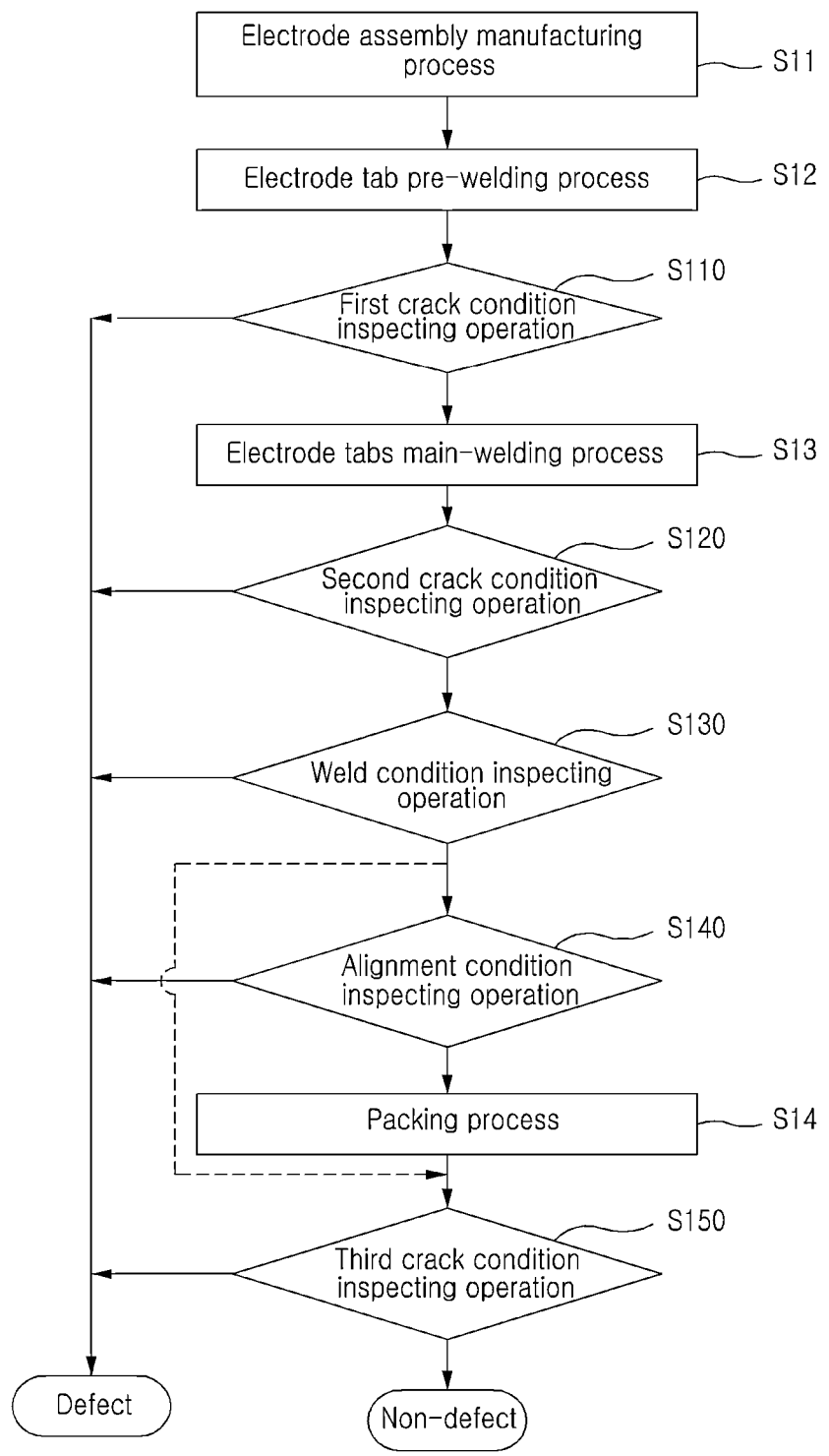
FIG. 3 is a flowchart of a secondary battery manufacturing method to describe a non-destructive inspection method for a pouch-type secondary battery according to one or more embodiments of the disclosed technology.

FIG. 3 is a flowchart of a secondary battery manufacturing method to describe a non-destructive inspection method for a pouch-type secondary battery according to one or more embodiments of the disclosed technology. For the purpose of illustration, FIG. 3 is described with reference to FIG. 4-FIG. 7.

Referring to FIGS. 1A, 1B, and 3, the non-destructive inspection method for inspecting the pouch-type secondary battery according to these embodiments may include a first crack condition inspecting operation S110, a second crack condition inspecting operation S120, and a weld condition inspecting operation S130.

The first crack condition inspecting operation S110 may be performed after the electrode tab pre-welding process S12, and may refer to an operation in which a first crack condition of the electrode tabs 12 is inspected by measuring the first crack condition of the electrode tabs 12, which may occur during the electrode tab pre-welding process S12, and comparing a measured first crack-condition measurement signal and a preset first crack-condition reference signal.

In some embodiments, the electrode tab pre-welding process S12 performed before the first crack condition inspecting operation S110 refers to a process of pre-welding and aligning a plurality of electrode tabs 12 extended from the electrode assembly 11 manufactured in advance through the electrode assembly manufacturing process S11. For example, the plurality of electrode tabs 12 extended from the negative or positive electrode plates of the electrode assembly 11 are pre-welded W1 and aligned by ultrasonic waves or a laser. The plurality of electrode tabs 12 are bent through the electrode tab pre-welding process S12, so that pre-welded free ends thereof can be stacked. Thus, a first crack may occur in the area of the electrode tabs 12 bent and stacked through the electrode tab pre-welding process S12.

Figure 4:
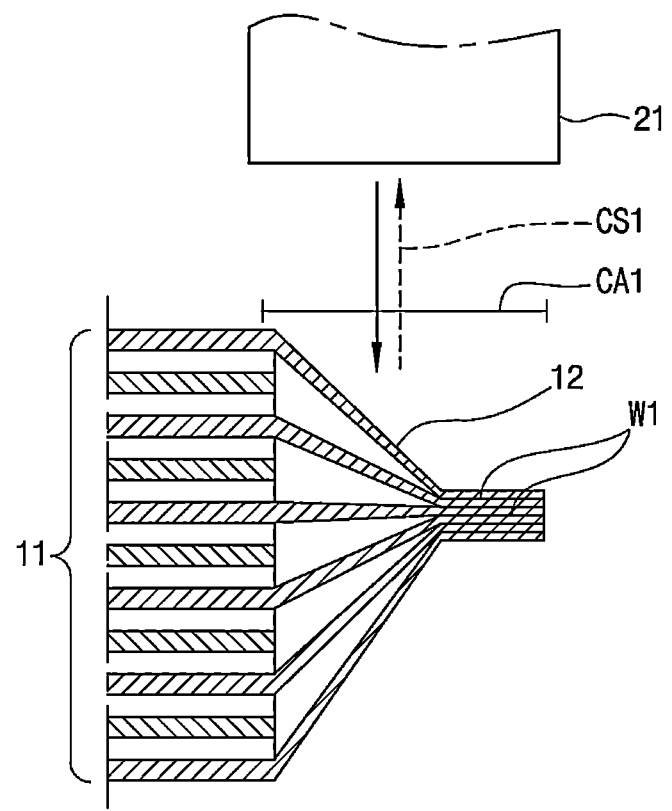
FIG. 4 illustrates an example process of obtaining a first crack-condition measurement signal in a first crack condition inspecting operation, according to embodiments.

In the first crack condition inspecting operation S110, the first crack-condition measurement signal for the area of the electrode tabs 12 may be obtained while relatively moving the secondary battery to be inspected or a non-contact sensor. The non-contact sensor employed herein may include a reflective eddy current sensor. Referring to FIG. 4, a reflective eddy current sensor 21 may include a transmitter and a receiver contactlessly disposed at one side of the secondary battery 10, in which the transmitter transmits a transmission signal to the electrode tabs 12 and the receiver receives a reflection signal CS1 reflected from the electrode tabs 12. For example, the reflection signal CS1 varied depending on the first crack condition present in the electrode tabs 12 while the transmission signal is reflected from the electrode tabs 12 may be the first crack-condition measurement signal.

The inspection for the crack condition is to inspect cracks present outside the electrode tabs 12, and therefore the reflective eddy current sensor 21 for receiving the reflection signal CS1 reflected from the electrode tabs 12 may be used in the crack condition inspecting operation.

A measurement area CA1 of the first crack-condition measurement signal obtained in the first crack condition inspecting operation S110 may be the entire area of the electrode tabs 12. For example, from one end connected to and bent from the electrode assembly 11 to the free ends pre-welded W1 and stacked. In some embodiments, the measurement area CA1 of the first crack-condition measurement signal may be a partial area of the pre-welded W1 and stacked free ends of the electrode tabs 12. The measurement area CA1 of the first crack-condition measurement signal may be varied depending on the types and specifications of reflective eddy current sensors to be used. For example, the first crack-condition measurement signal for the entire area of the electrode tabs 12 may be obtained at once by scanning once with the reflective eddy current sensor having a relatively wide inspection area, or the first crack-condition measurement signal for the entire area of the electrode tabs 12 may be obtained several times by scanning several times with the reflective eddy current sensor having a relatively narrow inspection area.

In some embodiments, when the first crack-condition measurement signal is measured in the first crack condition inspecting operation S110, the first crack condition for the area of the electrode tabs 12 can be inspected by comparing the measured first crack-condition measurement signal and the preset first crack-condition reference signal. The first crack-condition reference signal may refer to a reference signal measured in the electrode tabs 12 having no cracks after the pre-welding W1. For example, when the first crack-condition measurement signal is out of an allowable error range from the first crack-condition reference signal, those electrode tabs 12 may be determined as defective products due to the crack. In some embodiments, when the first crack-condition measurement signal is within the allowable error range from the first crack-condition reference signal, those electrode tabs 12 are determined as normal products. In some embodiments, only the non-defective electrode tabs can be moved on to the next process (e.g., electrode tabs main-welding process S13).

The second crack condition inspecting operation S120 may be performed after the electrode tab main-welding process S13, and may refer to an operation in which a second crack condition of the electrode tabs 12 may be inspected by measuring the second crack condition of the electrode tabs 12, which may occur during the electrode tab main-welding process S13, and comparing a measured second crack-condition measurement signal and a preset second crack-condition reference signal.

In some embodiments, the electrode tab main-welding process S13 performed before the second crack condition inspecting operation S120 refers to a process of main-welding and connecting an electrode lead 13 to the pre-welded electrode tabs 12. For example, the electrode lead 13 is main-welded W2 and connected to the plurality of electrode tabs 12 by ultrasonic waves or a laser. Thus, a second crack may occur in the area of the electrode tabs 12 through the electrode tab main-welding process S13.

Figure 5:
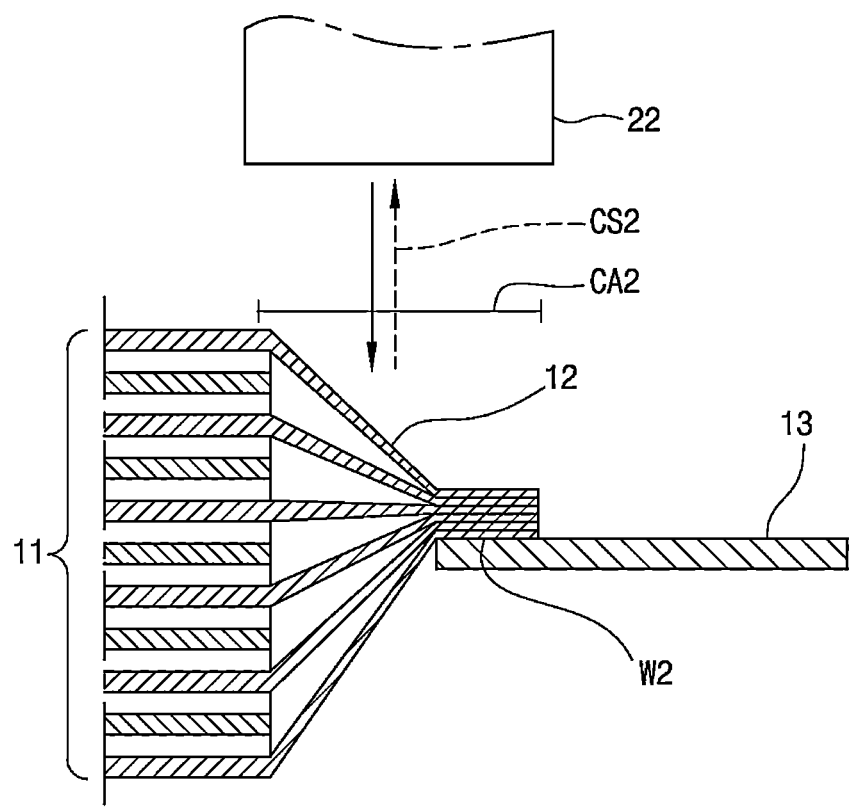
FIG. 5 illustrates an example describing process of obtaining a second crack-condition measurement signal in a second crack condition inspecting operation, according to embodiments.

The second crack condition inspecting operation S120 may be substantially the same as the foregoing first crack condition inspecting operation S110. For example, the second crack-condition measurement signal for the area of the electrode tabs 12 may be obtained while relatively moving the secondary battery to be inspected or a non-contact sensor. The non-contact sensor employed herein may include a reflective eddy current sensor. Referring to FIG. 5, a reflective eddy current sensor 22 may include a transmitter and a receiver contactlessly disposed at one side of the secondary battery 10, in which the transmitter transmits a transmission signal to the electrode tabs 12 and the receiver receives a reflection signal CS2 reflected from the electrode tabs 12. For example, the reflection signal CS2 varied depending on the second crack condition present in the electrode tabs 12 while the transmission signal is reflected from the electrode tabs 12 may be the second crack-condition measurement signal. The reflective eddy current sensor 22 used in the second crack condition inspecting operation S120 may be the same as the reflective eddy current sensor 21 used in the first crack condition inspecting operation S110.

A measurement area CA2 of the second crack-condition measurement signal obtained in the second crack condition inspecting operation S120 may also be the entire area of the electrode tabs 12, for example, from one end connected to and bent from the electrode assembly 11 to the free ends main-welded W2. Of course, the measurement area CA2 of the second crack-condition measurement signal may be a partial area of the main-welded W2 free ends of the electrode tabs 12. The second crack-condition measurement signal for the entire area of the electrode tabs 12 may be obtained at once by scanning once with the reflective eddy current sensor having a relatively wide inspection area, or the second crack-condition measurement signal for the entire area of the electrode tabs 12 may be obtained several times by scanning several times with the reflective eddy current sensor having a relatively narrow inspection area.

When the second crack-condition measurement signal is measured in the second crack condition inspecting operation S120, the second crack condition for the area of the electrode tabs 12 is inspected by comparing the measured second crack-condition measurement signal and the preset second crack-condition reference signal. The second crack-condition reference signal can refer to a reference signal measured in the electrode tabs 12 having no cracks after the main-welding W2. For example, when the second crack-condition measurement signal is out of an allowable error range from the second crack-condition reference signal, those electrode tabs 12 may be determined as defective products due to the crack. In some embodiments, when the second crack-condition measurement signal is within the allowable error range from the second crack-condition reference signal, those electrode tabs 12 are determined as normal products. In some embodiments, only the passed electrode tabs are moved on to the next process.

The weld condition inspecting operation S130 may be performed after the electrode tab main-welding process S13, and may refer to an operation in which a weld condition of the electrode tabs 12 may be inspected by measuring the weld condition of the electrode tabs 12, and comparing a measured weld-condition measurement signal and a preset weld-condition reference signal. Here, the weld condition may refer to weld strength.

In some embodiments, the weld condition inspecting operation S130 may be performed following the foregoing second crack condition inspecting operation S120, prior to the second crack condition inspecting operation S120, or simultaneously with the second crack condition inspecting operation S120.

Figure 6:
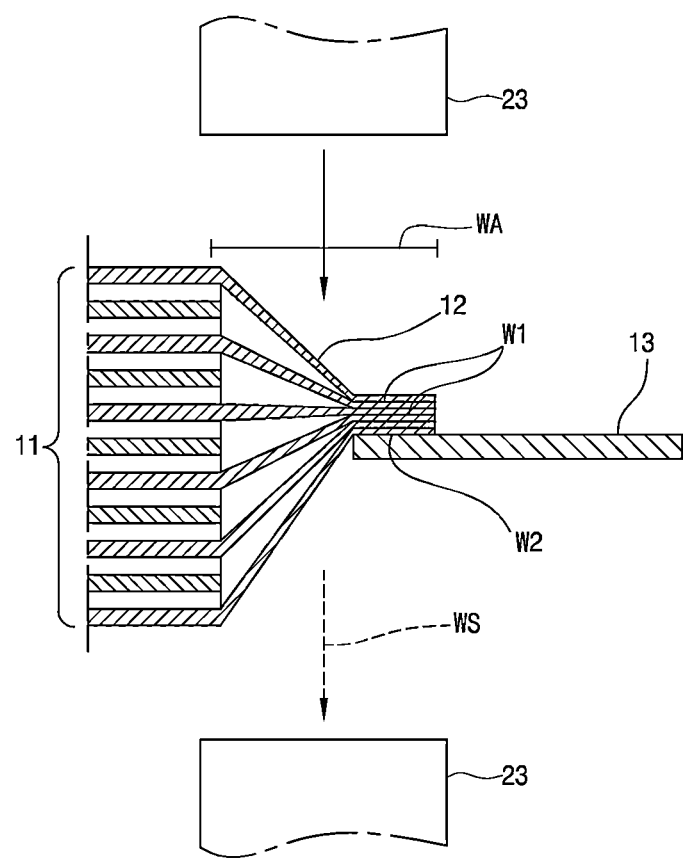
FIG. 6 illustrates an example process of obtaining a weld-condition measurement signal in a weld-condition inspecting operation or an alignment condition measurement signal in an alignment condition inspecting operation, according to embodiments.

The weld condition inspecting operation S130 may obtain the weld-condition measurement signal for the area of the electrode tabs 12 while relatively moving the secondary battery to be inspected or the non-contact sensor. The non-contact sensor used herein may include a transmissive eddy current sensor. Referring to FIG. 6, a transmissive eddy current sensor 23 may include a transmitter contactlessly disposed at one side of the secondary battery 10, and a receiver contactlessly disposed at the other side of the secondary battery 10, in which the transmitter transmits a transmission signal toward the electrode tabs 12 and the receiver receives a transmission signal WS transmitted through the electrode tabs 12. For example, the transmission signal WS can be varied depending on the weld strength of the welded portions W1 and W2 of the electrode tabs 12 while the transmission signal passes through the electrode tabs 12 may be the weld-condition measurement signal.

The inspection for the weld condition is to inspect the weld strength or the like between the electrode tab 12 and the electrode tab 12, and a connecting portion between the electrode tabs 12 and the electrode lead 13, such as the weld strength or the like inside the electrode tabs 12, and therefore the reflective sensor cannot detect the weld condition. Therefore, the weld condition inspecting operation may employ the transmissive eddy current sensor 23 that receives the transmission signal WS passed through the electrode tabs 12.

In some embodiments, because the transmissive eddy current sensor 23 receives the transmission signal WS passed through the electrode tabs 12, the received measurement signal may include not only the weld-condition measurement signal but also the crack-condition measurement signal. Therefore, it may be difficult to accurately determine through the received transmission signal WS whether the defect is caused by the crack condition or the weld condition.

This deficiency can be resolved by the disclosed technology according to one or more embodiments as disclosed herein. For example, the electrode tabs 12 determined to be defective in terms of the crack condition are filtered out in advance by the first crack condition inspecting operation S110 and the second crack condition inspecting operation S120, and the weld condition inspecting operation S130 can be performed for the electrode tabs 12 determined to be passed in terms of the crack condition. Therefore, the transmission signal WS received in the transmissive eddy current sensor 23 may include information about the weld condition.

A measurement area WA of the weld-condition measurement signal obtained in the weld condition inspecting operation S130 may also be the entire area of the electrode tabs 12. In some embodiments, the measurement area WA of the weld-condition measurement signal may be a partial area of the free ends having the welded portions W1 and W2 of the electrode tabs 12. The weld-condition measurement signal for the entire area of the electrode tabs 12 may be obtained at once by scanning once with the reflective eddy current sensor having a relatively wide inspection area, or the weld-condition measurement signal for the entire area of the electrode tabs 12 may be obtained several times by scanning several times with the reflective eddy current sensor having a relatively narrow inspection area.

When the weld-condition measurement signal is measured in the weld condition inspecting operation S130, the weld condition for the area of the electrode tabs 12 may be inspected by comparing the measured weld-condition measurement signal and the preset weld-condition reference signal. The weld-condition reference signal may refer to a reference signal measured in the state that the welded portions W1 and W2 connecting the electrode tabs 12 and the electrode lead 13 have appropriate weld strength. For example, when the weld-condition measurement signal is out of an allowable error range from the weld-condition reference signal, those electrode tabs 12 are determined to have a defective weld condition. In some embodiments, when the weld-condition measurement signal is within the allowable error range from the weld-condition reference signal, those electrode tabs 12 are determined to have a normal weld condition. Only the passed electrode tabs are moved on to the next process.

Figure 8A:
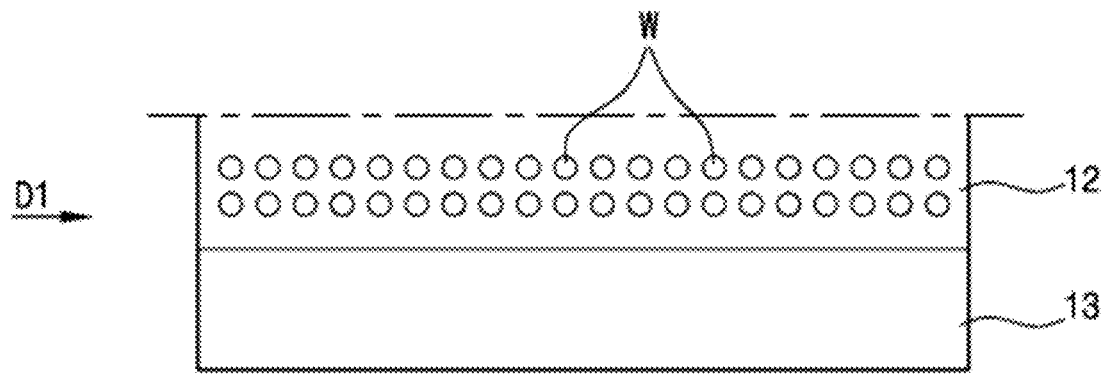
FIG. 8A illustrates comparison between a weld-condition reference signal and a weld-condition measurement signal measured in normally welded electrode tabs at the weld condition inspecting operation, according to embodiments.
Figure 8B:
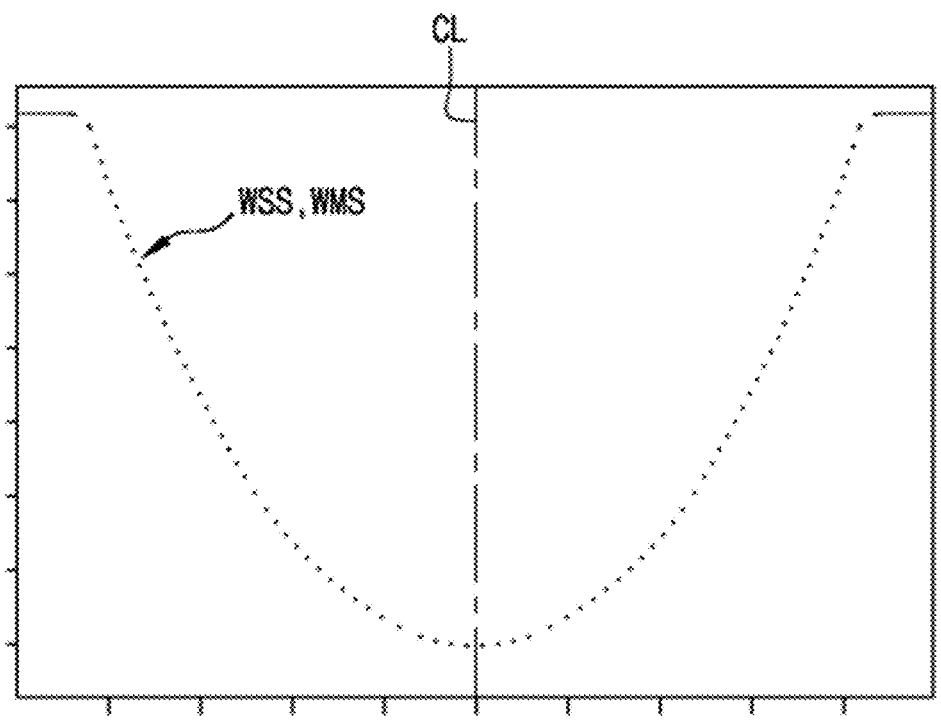
FIG. 8B illustrates an example of weld-condition measurement signal (WMS) and weld-condition reference signal (WSS).

FIG. 8A illustrates a comparison between a weld-condition reference signal and a weld-condition measurement signal measured in normally welded electrode tabs at the weld condition inspecting operation, according to embodiments. FIG. 8B illustrates an example of weld-condition measurement signal (WMS) and weld-condition reference signal (WSS). For the purpose of illustration, FIGS. 8A and 8B are described with reference to FIG. 3.

When the welded portion W of the electrode tabs 12 is measured in the weld condition inspecting operation S130 while relatively moving the secondary battery to be inspected or the eddy current sensor in the direction of D1 as shown in FIG. 8A, the WMS for each position of the welded portion W of the electrode tabs 12 is obtained as shown in FIG. 8B. In some embodiments, the electrode tabs 12 are determined to have a normal weld condition when the WMS matches the WSS.

Figure 9A:
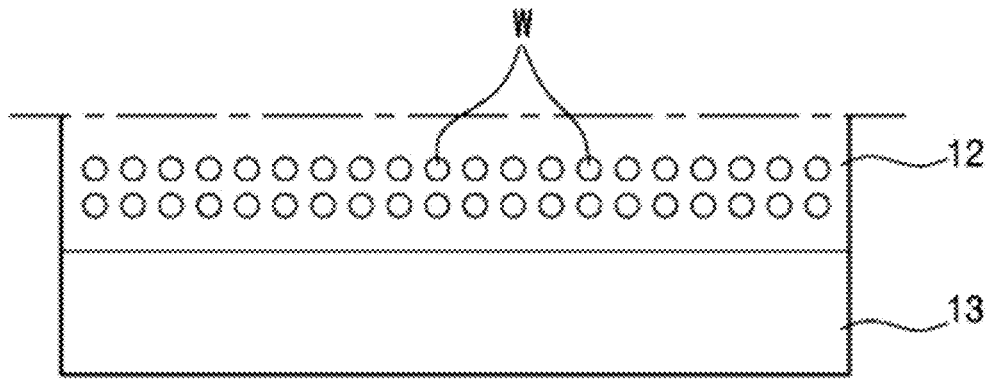
FIG. 9A illustrates an example of a comparison between a weld-condition reference signal and a weld-condition measurement signal measured in defectively welded electrode tabs (defects in weld strength) at the weld condition inspecting operation, according to embodiments.
Figure 9B:
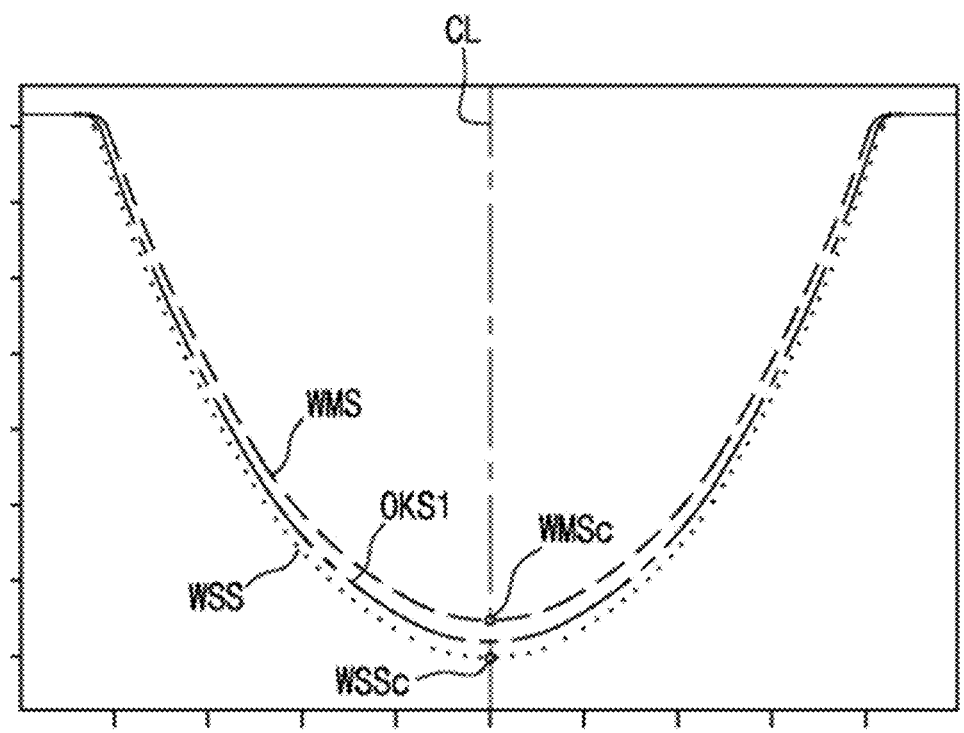
FIG. 9B illustrates an example of weld-condition measurement signal (WMS) and weld-condition reference signal (WSS) with an allowable error range (OKS1), a central value (WSSc), and an central value (WMSc) of the WMS.

FIG. 9A illustrates an example of a comparison between a weld-condition reference signal and a weld-condition measurement signal measured in defectively welded electrode tabs (defects in weld strength) at the weld condition inspecting operation, according to embodiments. FIG. 9B illustrates an example of weld-condition measurement signal (WMS) and weld-condition reference signal (WSS) with an allowable error range (OKS1), a central value (WSSc), and an central value (WMSc) of the WMS. For the purpose of illustration, FIGS. 9A and 9B are described with reference to FIG. 3.

As shown in FIGS. 9A and 9B, in the weld condition inspecting operation S130, it may be determined whether there is a defect in the weld strength of the welded portion W of the electrode tabs 12, by comparing the WSSc on a center line CL of the WSS and the WMSc on the CL of the WMS. For example, when the WMSc of the WMS is within the OKS1 from the WSSc of the WSS, the electrode tabs 12 can be determined to have normal weld strength. As shown therein, when the WMSc of the WMS is out of the OKS1 from the WSSc of the WSS, the electrode tabs 12 can be determined to have defective weld strength.

Figure 10A:
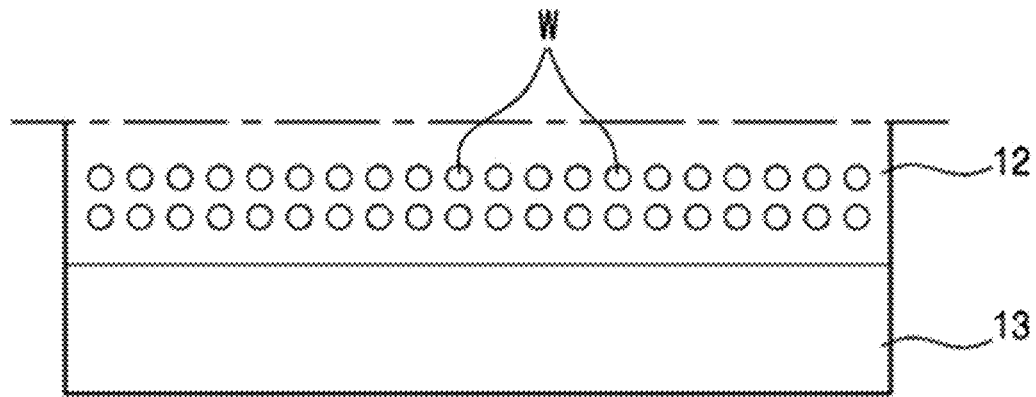
FIG. 10A illustrates an example of a comparison between a weld-condition reference signal and a weld-condition measurement signal measured in defectively welded electrode tabs (defects due to asymmetric weld strength) at the weld condition inspecting operation, according to embodiments.
Figure 10B:
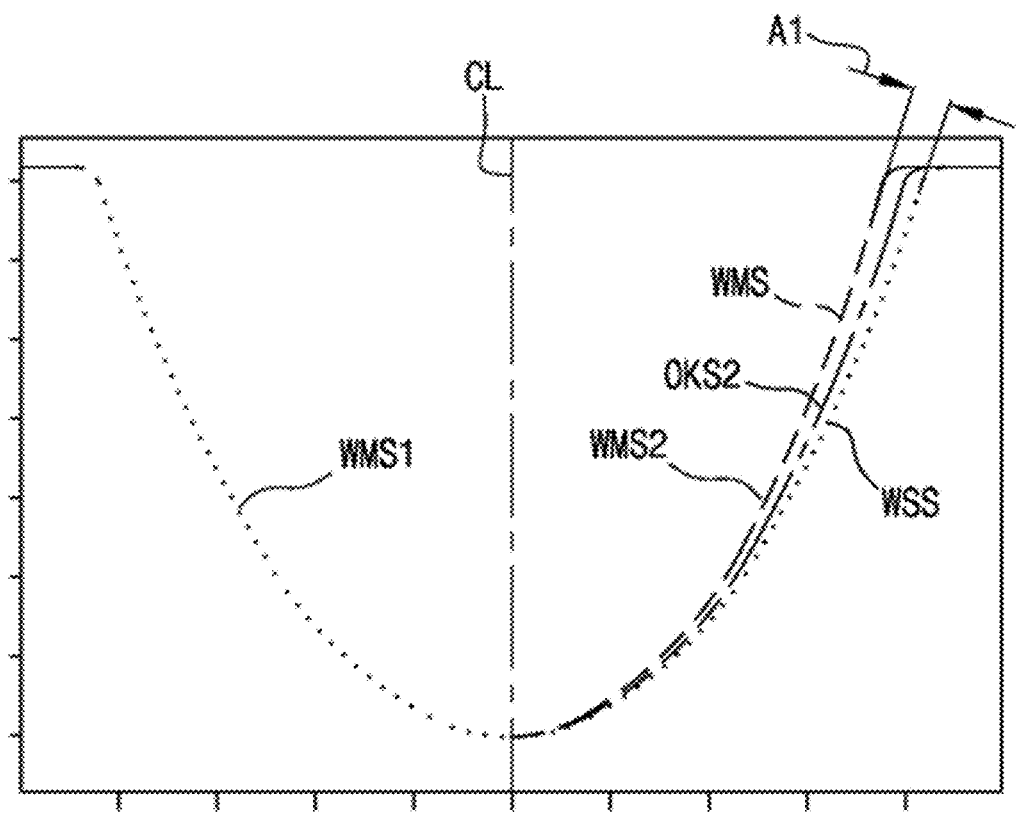
FIG. 10B illustrates an example of weld-condition measurement signals (WMS, WMS1, WMS2) and weld-condition reference signal (WSS) with an allowable error range (OKS2).

FIG. 10A illustrates an example of comparison between a weld-condition reference signal and a weld-condition measurement signal measured in defectively welded electrode tabs (defects due to asymmetric weld strength) at the weld condition inspecting operation, according to embodiments. FIG. 10B illustrates an example of weld-condition measurement signals (WMS, WMS1, WMS2) and weld-condition reference signal (WSS) with an allowable error range (OKS2). For the purpose of illustration, FIGS. 10A and 10B are described with reference to FIG. 3.

As shown in FIGS. 10A and 10B, in the weld condition inspecting operation S130, it may be determined whether there is a defect in the weld strength of the welded portion W of the electrode tabs 12, by determining whether a left signal area (WMS1) and a right signal area (WMS2) of the weld-condition measurement signal (WMS) are symmetrical with respect to the center line (CL) of the WSS. For example, when a difference value A1 between the WSS and the WMS due to the asymmetry between the WMS1 and the WMS2 is within the range of OKS2 from the WSS, the welded portion W of the electrode tabs 12 may be determined to maintain normal weld strength and symmetry. As shown therein, when the difference value A1 between the WSS and the WMS is out of the range of OKS2 from the WSS, the welded portion W of the electrode tabs 12 may be determined to be asymmetric and have defective weld strength. In some embodiments, the difference A1 between the WMS and the WSS may be a degree of increasing or decreasing an integral value of the WMS corresponding to the entire areas of the WMS1 and the WMS2.

In some embodiments, the non-destructive inspection method for the pouch-type secondary battery according to an embodiment may further include an alignment condition inspecting operation S140.

The alignment condition inspecting operation S140 may be performed after the electrode tab main-welding process S13, and may refer to an operation in which an alignment condition of the electrode tabs 12 is inspected by measuring the alignment condition of the electrode tabs 12, and comparing a measured alignment condition measurement signal and a preset alignment condition reference signal.

In some embodiments, the area of the electrode tabs 12 may have a defective alignment condition such as folding or lifting while undergoing the electrode tab pre-welding process S12 and the electrode tab main-welding process S13. For example, a folding area may be formed in a bending area of the electrode tabs 12 connected to the electrode assembly, and a lifting area may be formed in the welded portions W1 and W2.

The alignment condition inspecting operation S140 may be performed following the foregoing weld condition inspecting operation S130, prior to the weld condition inspecting operation S130, or simultaneously with the weld condition inspecting operation S130. Further, the alignment condition inspecting operation S140 may be performed in substantially the same manner as the weld condition inspecting operation S130. The transmissive eddy current sensor used in the alignment condition inspecting operation S140 may be the same sensor as the transmissive eddy current sensor 23 used in the foregoing weld condition inspecting operation S130.

When the alignment condition measurement signal is measured in the alignment condition inspecting operation S140, the alignment condition such as folding and lifting of the electrode tabs 12 may be inspected by comparing a measured alignment condition measurement signal and a preset alignment condition reference signal. The alignment condition reference signal refers to a reference signal measured in the electrode tabs 12 straightly aligned without being folded or lifted after performing the main welding W2. For example, when the alignment condition measurement signal is out of an allowable error range from the alignment condition reference signal, those electrode tabs 12 may be determined as defective alignment conditions. In some embodiments, when the alignment condition measurement signal is within the allowable error range from the alignment condition reference signal, those electrode tabs 12 may be determined as normal products. Only the passed electrode tabs are moved on to the next process.

In some embodiments, the non-destructive inspection method for the pouch-type secondary battery may further include a third crack condition inspecting operation S150.

The third crack condition inspecting operation S150 may be performed after the packing process S14, and may refer to an operation in which a third crack condition of the electrode tabs 12 is inspected by measuring a third crack condition of the electrode tabs 12, which may occur in the packing process S14, and comparing a measured third crack-condition measurement signal and a preset third crack-condition reference signal.

In some embodiments, the packing process S14 performed before the third crack condition inspecting operation S150 refers to a process of packing the electrode assembly including the electrode tabs 12 into the pouch 14. For example, the electrode assembly 11 including the electrode tabs 12 is accommodated and packed into the pouch 14 in the state that the electrode lead 13 is partially exposed to the outside, and an adhering process is then performed using a sealant or the like for sealing between the electrode lead 13 and the pouch 14. Even during the packing process S14, a third crack may occur in the area of the electrode tabs 12. For example, during the packing process S14, only the crack may occur without a change in the foregoing weld condition.

Figure 7:
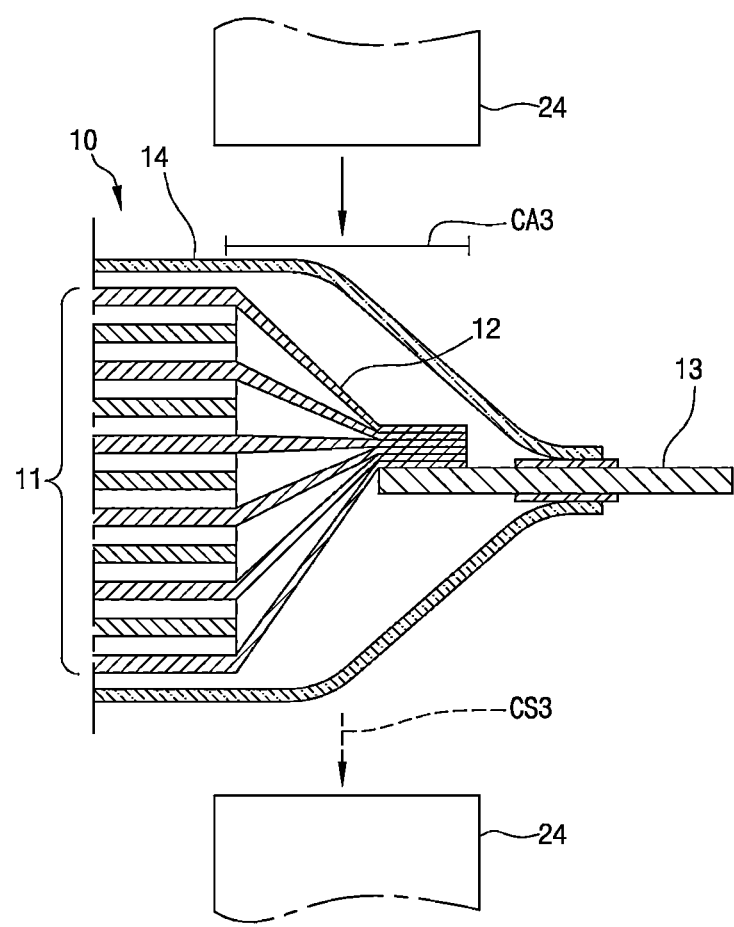
FIG. 7 illustrates an example process of obtaining a third crack-condition measurement signal in a third crack condition inspecting operation, according to embodiments.

The third crack condition inspecting operation S150 may be performed in substantially the same manner as the foregoing weld condition inspecting operation S130. For example, the third crack-condition measurement signal for the area of the electrode tabs 12 may be obtained while relatively moving the secondary battery to be inspected or the non-contact sensor. The non-contact sensor used herein may include a transmissive eddy current sensor. Referring to FIG. 7, a transmissive eddy current sensor 24 may include a transmitter contactlessly disposed at one side of the secondary battery 10, and a receiver contactlessly disposed at the other side of the secondary battery 10, in which the transmitter transmits a transmission signal toward the electrode tabs 12 covered with the pouch 14, and the receiver receives a transmission signal CS3 sequentially transmitted through the pouch 14 and the electrode tabs 12. For example, the transmission signal CS3 varied depending on the third crack condition of the electrode tabs 12 while the transmission signal passes through the pouch 14 and the electrode tabs 12 in sequence may be the third crack-condition measurement signal. The transmissive eddy current sensor 24 used in the third crack condition inspecting operation S150 may be the same sensor as the transmissive eddy current sensor 23 used in the weld condition inspecting operation S130 and the alignment condition inspecting operation S140 described above.

In some embodiments, the third crack condition inspecting operation S150 inspects the area of the electrode tabs 12 covered with the pouch 14, and therefore the third crack-condition measurement signal measured after passing through the electrode tabs 12 with the pouch 14 the third crack condition inspecting operation S150 and the weld-condition measurement signal measured after passing only the electrode tabs 12 without the pouch 14 in the weld condition inspecting operation S130 basically have similar signal patterns even though the third crack-condition measurement signal and the weld-condition measurement signal are slightly different from each other.

In some embodiments, the third crack-condition measurement signal having a signal pattern similar to the weld-condition measurement signal is obtained in combination with the measurement signals varied depending on the pouch 14 and the welded portions W1 and W2, and therefore only the third crack-condition measurement signal measured in the third crack condition inspecting operation S150 is lowly discriminative to be used as a criterion for inspecting a defect caused by the third crack present in the electrode tabs 12.

Accordingly, the third crack condition inspecting operation S150 according to an embodiment compares the measured third crack-condition measurement signal and the preset third crack-condition reference signal, in which a difference between the weld-condition measurement signal previously measured without the pouch 14 in the weld condition inspecting operation S130 and a newly measured third crack-condition measurement signal is calculated, and the calculated difference and the third crack-condition reference signal are compared, thereby detecting whether the electrode tabs 12 are defective due to cracks before final shipment. For example, when the difference between the weld-condition measurement signal and the third crack-condition measurement signal is within an allowable error range from the third crack-condition reference signal, the electrode tabs 12 may be determined as normal products without defects due to cracks. When the difference between the weld-condition measurement signal and the third crack-condition measurement signal is out of the allowable error range from the third crack-condition reference signal, the electrode tabs 12 may be determined as defective products having cracks.

In some embodiments, the difference between the weld-condition measurement signal and the third crack-condition measurement signal, the third crack-condition reference signal, and the allowable error range may be provided as numerical information.

According to the one or more embodiments of the disclosed technology, the weld-condition measurement signal previously measured in the weld condition inspecting operation S130 prior to the third crack condition inspecting operation S150 performed following the packing process S14 is used, and the difference between the weld-condition measurement signal and the third crack-condition measurement signal is used as a criterion for finally inspecting the crack condition of the electrode tabs 12 before shipment, thereby accurately detecting a defect in products due to at least one of the crack, alignment, and weld conditions of the electrode tabs 12 of the secondary battery 10 to be finally shipped.

In some embodiments, in the third crack condition inspecting operation S150 like the weld condition inspecting operation S130 showing a similar signal pattern, symmetry of the third cracks formed in the electrode tabs 12 or a crack condition (partial or complete cracks) is more accurately determined by comparing the central value on the center line of the third crack-condition reference signal and the central value on the center line of the third crack-condition measurement signal, or by determining whether a left signal area and a right signal area of the third crack-condition measurement signal are symmetrical with respect to the center line of the third crack-condition reference signal (see FIGS. 9 and 10).

As described above, a non-destructive inspection method for a pouch-type secondary battery according to the disclosed technology primarily inspects a crack condition in an area of electrode tabs after an electrode tab pre-welding process, and secondarily inspects a crack condition and a weld condition in the area of the electrode tabs after an electrode tab main-welding process, thereby accurately detecting whether the area of the electrode tabs, of which the welding processes are completed, is defective due to the crack and weld conditions before a packing process, i.e., before being packed into the pouch.

Further, the non-destructive inspection method for the pouch-type secondary battery according to the disclosed technology finally inspects the crack condition present in the area of the electrode tabs covered with the pouch after the packing process, in which the difference calculated between a previously measured weld-condition measurement signal and a newly measured crack-condition measurement signal is used as a criterion for detecting cracks, so that the inspection of the crack condition can be highly discriminative in a crack condition inspecting operation after the packing process, and a defect caused by at least one of the crack, alignment, and weld conditions in the area of the electrode tabs of the secondary battery to be finally shipped is accurately detected without erroneous detection, thereby largely increasing the yield of the secondary battery.

Although a few embodiments of the disclosed technology have been described above with reference to the accompanying drawings, it will be appreciated by those skilled in the art that various changes or modifications can be made without departing from the spirit and scope of the disclosed technology defined in the appended claims.

What is claimed is:

1. A non-destructive inspection method for inspecting a pouch-type secondary battery during a manufacturing process of the pouch-type secondary battery, wherein the process includes an electrode tab pre-welding process for pre-welding and aligning a plurality of electrode tabs extended from an electrode assembly; an electrode tab main-welding process for main-welding and connecting an electrode lead to the pre-welded electrode tabs; and a packing process for packing the electrode tabs and the electrode assembly into a pouch, the non-destructive inspection method comprising:

a first crack condition inspecting operation to inspect a first crack condition of the electrode tabs by measuring the first crack condition of the electrode tabs, which occurs in the electrode tab pre-welding process, and comparing a measured first crack-condition measurement signal and a first crack-condition reference signal, wherein the first crack condition inspecting operation is performed after the electrode tab pre-welding process;

a second crack condition inspecting operation to inspect a second crack condition of the electrode tabs by measuring a second crack condition of the electrode tabs, which occurs in the electrode tab main-welding process, and comparing a measured second crack-condition measurement signal and a second crack-condition reference signal, wherein the second crack condition inspecting operation is performed after the electrode tab main-welding process; and a weld condition inspecting operation to inspect a weld condition of the electrode tabs by measuring a weld condition of the electrode tabs, and comparing a measured weld-condition measurement signal and a weld-condition reference signal, wherein the weld condition inspecting operation is performed after the electrode tab main-welding process.

2. The non-destructive inspection method of claim 1, wherein
the first crack-condition measurement signal and the second crack-condition measurement signal comprise reflection signals reflected from the electrode tabs, and
the weld-condition measurement signal comprises a transmission signal transmitted through the electrode tabs.

3. The non-destructive inspection method of claim 1, further comprising a third crack condition inspecting operation to inspect a third crack condition of the electrode tabs by measuring the third crack condition of the electrode tabs, which occurs in the packing process, and comparing a measured third crack-condition measurement signal and a third crack-condition reference signal, wherein the third crack condition inspecting operation is performed after the packing process.

4. The non-destructive inspection method of claim 3, wherein the third crack condition inspecting operation comprising:
    calculating a difference value between the weld-condition measurement signal previously obtained in the weld condition inspecting operation and the third crack-condition measurement signal; and
    determining the pouch-type secondary battery to be normal upon the difference being within an allowable error range from the third crack-condition reference signal.

5. The non-destructive inspection method of claim 3, wherein
    the first crack-condition measurement signal and the second crack-condition measurement signal comprise reflection signals reflected from the electrode tabs, wherein the weld-condition measurement signal comprises a transmission signal transmitted through the electrode tabs, and wherein the third crack-condition measurement signal comprises a transmission signal transmitted through the pouch and the electrode tabs.

6. The non-destructive inspection method of claim 1, further comprising an alignment condition inspecting operation to inspect an alignment condition of the electrode tabs by measuring the alignment condition of the electrode tabs, and comparing a measured alignment condition measurement signal and an alignment condition reference signal, wherein the alignment condition inspecting operation is performed after the electrode tab main-welding process.

7. The non-destructive inspection method of claim 6, wherein
    the first crack-condition measurement signal and the second crack-condition measurement signal comprise reflection signals reflected from the electrode tabs, and wherein the weld-condition measurement signal and the alignment condition measurement signal comprise transmission signals transmitted through the electrode tabs.

* * * * *